US007669810B2

(12) United States Patent
Chiang et al.

(10) Patent No.: US 7,669,810 B2
(45) Date of Patent: Mar. 2, 2010

(54) REVOLVING POSITION DEVICE

(75) Inventors: Chin Fu Chiang, Jhonghe (TW); Chih-Kang Peng, Jhonghe (TW)

(73) Assignee: AU Optronics Corporation, Hsinchu (TW)

( * ) Notice: Subject to any disclaimer, the term of this patent is extended or adjusted under 35 U.S.C. 154(b) by 302 days.

(21) Appl. No.: 11/836,654

(22) Filed: Aug. 9, 2007

(65) Prior Publication Data
US 2008/0043412 A1    Feb. 21, 2008

(30) Foreign Application Priority Data
Aug. 11, 2006  (TW) ............................. 95129576 A

(51) Int. Cl.
A47F 5/02       (2006.01)
(52) U.S. Cl. ....................... 248/131; 248/349; 248/919; 248/921
(58) Field of Classification Search ................. 248/131, 248/132, 145, 162.1, 415, 349.1, 521, 919, 248/921; 361/679.02
See application file for complete search history.

(56) References Cited
U.S. PATENT DOCUMENTS

| 4,640,486 A * | 2/1987 | Neville ........................ 248/425 |
| 4,697,778 A * | 10/1987 | Harashima ................ 248/349.1 |
| 4,946,127 A * | 8/1990 | Kulaga ........................ 248/551 |
| 5,564,669 A * | 10/1996 | Wu ........................ 248/346.01 |
| 7,131,619 B2 * | 11/2006 | Krapf et al. .................. 248/415 |
| 2008/0093528 A1* | 4/2008 | Tsai et al. .................... 248/917 |
| 2008/0303900 A1* | 12/2008 | Stowe et al. ................. 348/143 |

\* cited by examiner

Primary Examiner—Ramon O Ramirez
(74) Attorney, Agent, or Firm—Snell & Wilmer L.L.P.

(57) ABSTRACT

A variable revolving position device capable of facilitating revolving as well as providing a stable support for the display device at the same time. The variable revolving position device comprises a base, a revolving axle and a normal force providing device. The base includes a housing and a bottom, and the revolving axle includes a load bearing end and a friction block, wherein the housing has at least a first friction surface set correspondingly against a second friction surface formed in the upper surface of the friction block. The friction block is disposed in the housing, and is capable of moving along the axis up and down as well as revolving variably. The normal force providing device is disposed between the friction block and the bottom, where the normal force providing device provides a normal force pushing the friction block upwardly along the axis so that the second friction surface contacts the first friction surface.

24 Claims, 8 Drawing Sheets

REVOLVING POSITION DEVICE

CROSS-REFERENCE TO RELATED APPLICATIONS

This application claims priority based on a Taiwanese Patent Application No. 095129576 filed on Aug. 11, 2006.

BACKGROUND OF THE INVENTION

1. Field of the Invention

The present invention relates generally to a revolving position device and a display device for using the same; particularly, the present invention relates to a revolving position device for use with a display device.

2. Description of the Prior Art

The progress of the electronic display device technology fulfills mankind's various needs in the information society. Widely applied in the products such as personal digital assistants, PC monitors, household electronic appliances and even billboards, the electronic display device has become more and more important in our daily life.

Currently, there are two common types of position devices available for the household electronic display device. One is immobile type and the other is revolving type. The former type of position device is either in conjunction with the housing of the household electronic display device or disposed under the bottom surface of it. Although it provides a fairly stable support, there is also the drawback that the household electronic display device cannot be revolved at will. As to the later type of position device, although it makes it possible for the user to revolve the household electronic display device at will, due to the conventional structure of the spring fixation device, which mostly consists of a reaming base and a spring to stabilize the revolving axle, there is often a shaking problem, which results from the elastic fatigue of the spring or abrasion of the connection portion induced from overuse or repeatedly rotating the revolving axle. In addition, when the household electronic display device is heavier, it is also inconvenient for the user to revolve it.

FIG. 1 shows a conventional structure of the revolving position device. As FIG. 1 shows, the revolving position device includes a base 20, a revolving axle 30 and a spring fixation device 40, wherein the revolving axle 30 has a bearing seat 50 at the top, capable of supporting the household electronic display device 60. In a case where the user demands to rotate the revolving axle 30, the user has to overcome the gravity of the household electronic display device 60 and the friction between the revolving axle 30 and the spring fixation device 40 to meet the above demand. However, due to the elastic fatigue of the spring fixation device 40 or the abrasion of the connection portion induced from overuse or repeatedly rotating the revolving axle 30, there is often a shaking problem associated with the household electronic display device 60.

SUMMARY OF THE INVENTION

It is an object of the present invention to provide a revolving position device for use with a display device, which not only facilitates revolving but also provides a stable support for the display device at the same time. It is another object of the present invention to provide a revolving position device, which is capable of minimizing the abrasion that occurs between the revolving axle and the connection portion, so that the efficiency of the position device is enhanced. It is a further object of the present invention to provide a revolving position device, which is more convenient and easier for the user to assemble. It is a further object of the present invention to provide a revolving position device, which allows the user to adjust the amount of the force exerting on the revolving position device by controlling the proportion between the bear weight intensity and the weight of the display device.

The present invention of a revolving position device comprises a base, a revolving axle and a normal force providing device. The base includes a housing and a bottom, and the revolving axle includes a load bearing end and a friction block, wherein the housing includes at least a first friction surface that is set correspondingly against the second friction surface formed in the upper surface of the friction block of the revolving axle. The friction block is disposed inside the housing, capable of moving along the axis up and down as well as revolving variably. The normal force providing device is disposed between the friction block and the bottom, wherein the normal force providing device provides a normal force pushing the friction block upwardly along the axis so that the second friction surface contacts the first friction surface.

In the preferred embodiment, the base includes a circular body and a lateral wall connected to the circular body, and the revolving axle includes a brace axle and a friction block. The brace axle extends through the hole outwardly and connects to an object that needs bracing, and the friction block is set in the base, having a top portion bigger than the hole and capable of moving along the axis up and down as well as revolving variably. The normal force providing device is disposed between the base and the friction block, wherein the normal force providing device provides a bracing force upwardly to support the friction block. The friction block has an upper friction surface contacting the bottom surface of the circular body thereby generating a friction to brake the rotation of the revolving axle. When a user presses the revolving axle downwardly, the bracing force is countervailed and the friction between the upper surface and the bottom surface is further decreased so that the user may easily overcome the friction to rotate the revolving axle and the object that needs bracing.

The present invention also provides a display device coupled with a revolving position device. The revolving position device comprises a base, a revolving axle and a normal force providing device, wherein the base includes a housing and a bottom, and the revolving axle includes a load bearing end and a friction block. The friction block of the revolving axle is disposed in the housing and is capable of moving along the axis up and down as well as revolving variably. The display device has a seat connected to the load bearing end of the revolving position device. The normal force providing device is disposed between the friction block and the bottom, wherein the normal force providing device provides a normal force pushing the friction block upwardly along the axis, making the second friction surface formed in the upper surface of the friction block contact the first friction surface of the housing so that the display device is braced.

DETAILED DESCRIPTION OF THE PREFERRED EMBODIMENT

The present invention provides a revolving position device for use with a display device which aims not only to facilitate revolving but also to provide a stable support for the display device at the same time. The preferred embodiment of the present invention of the revolving position device is applied to the household electronic display device such as a television. However, in another embodiment, the revolving position device of the present invention may be applied to the devices such as the LCD monitor of PC or other display device that is heavier. In addition, the revolving position device of the present invention may be also coupled with other apparatus that needs revolving and bracing simultaneously.

Figure 1:
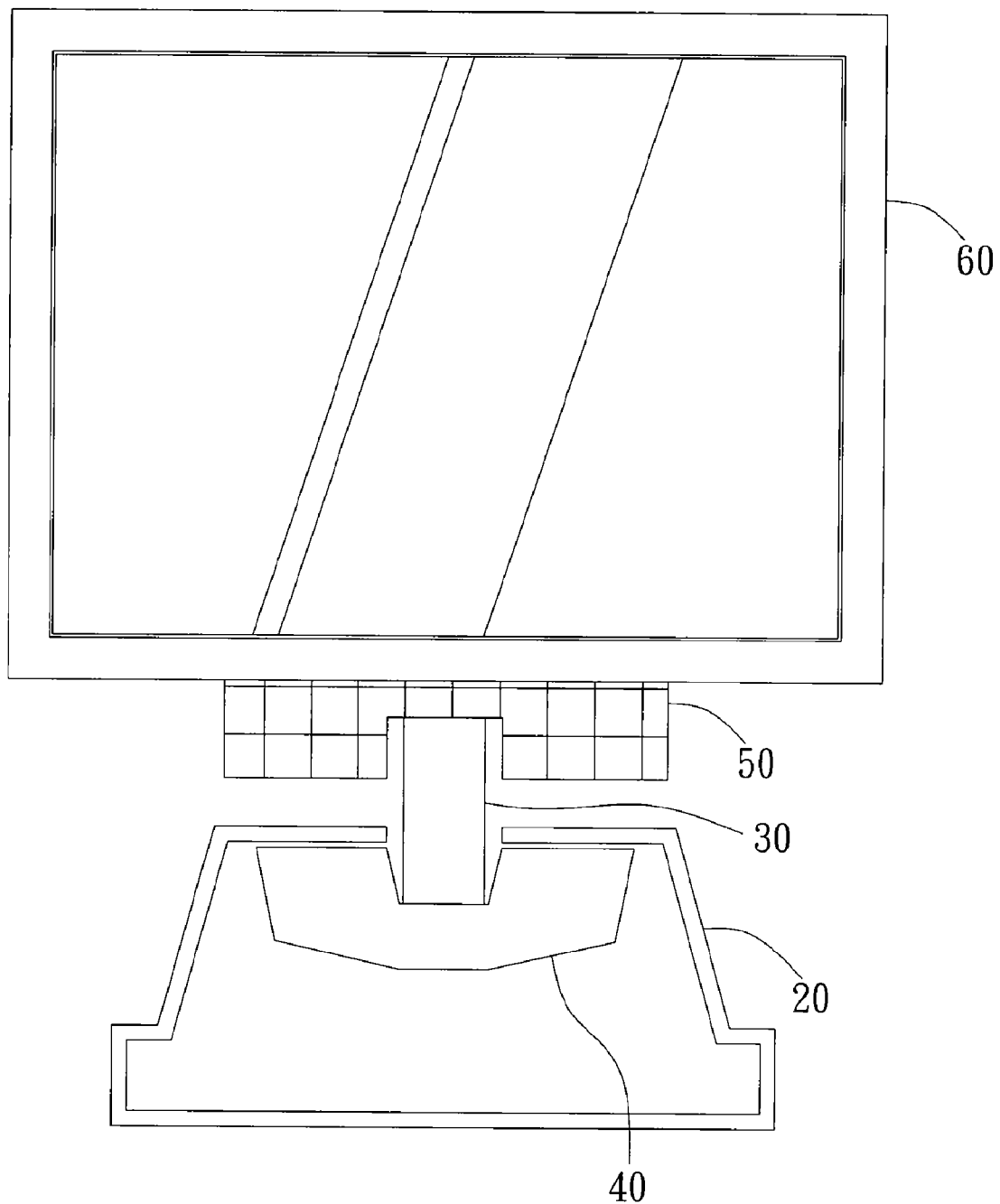
FIG. 1 shows a conventional structure of the revolving position device.
Figure 2A:
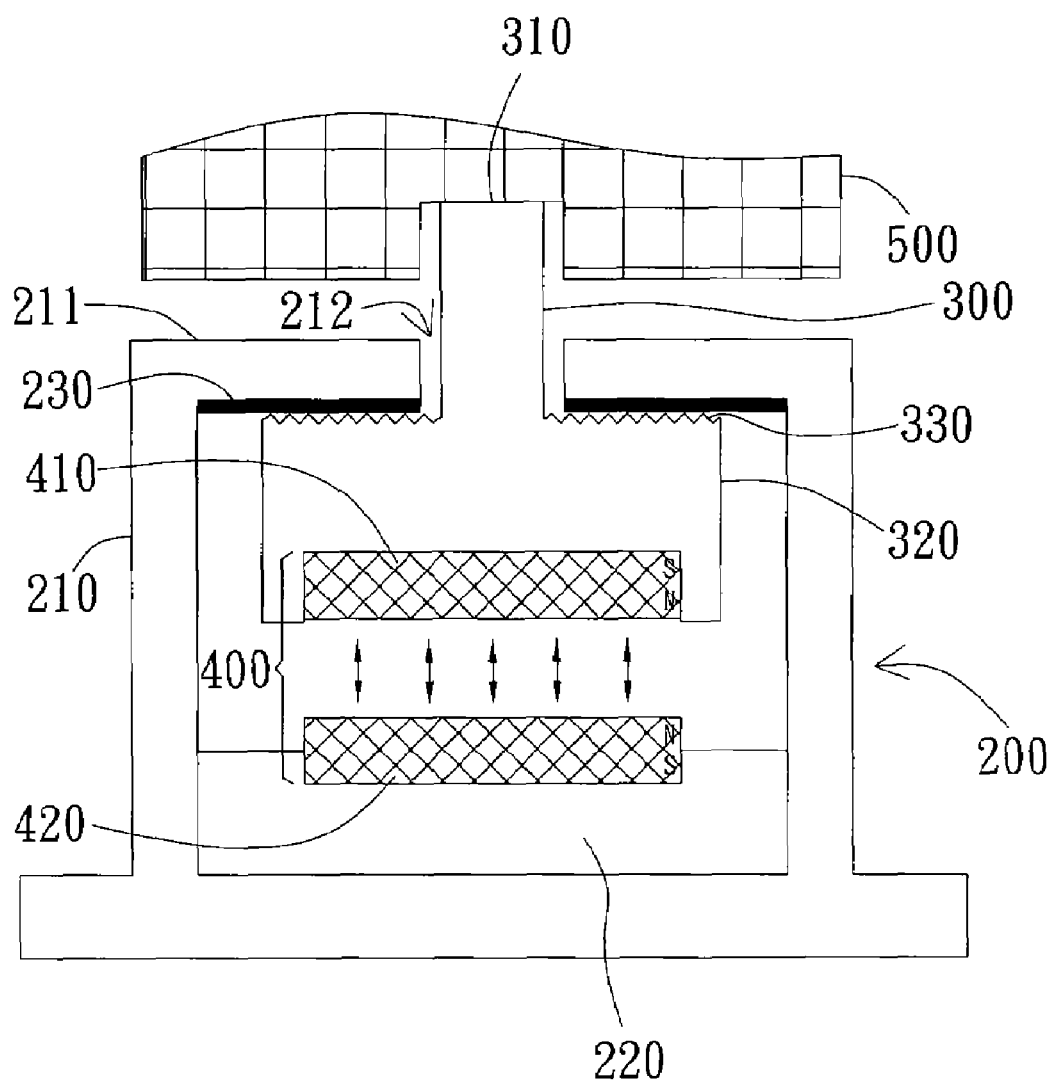
FIG. 2a is a sectional view of the embodiment of the back light module of present invention.

FIG. 2a shows a preferred embodiment of the revolving position device of the present invention. As the sectional view of FIG. 2a shows, the revolving position device comprises a base 200, a revolving axle 300, and a normal force providing device 400. Wherein the base 200 includes a housing 210 and a bottom 220, the revolving axle 300 includes a load bearing end 310 and a friction block 320 opposite to the load bearing end 310. The load bearing end 310 mentioned here refers to an end provided for bearing an object that needs bracing, the body weight of the object puts on the load bearing end 310 therefrom. As the preferred embodiment shown in FIG. 2a, the bottom 220 is disposed in the housing 210 and connected to the interior surface of the housing 210. As FIG. 2a shows, the shape of the housing 210 is preferably columnar, however, in another embodiment, the shape of the housing 210 may be polygonal-column, elliptic-column or other different kinds of shapes as well. As FIG. 2a shows, in this preferred embodiment, the housing 210 is made from the multi-walled carbon plastic material, however, in another embodiment, the housing 210 may be made from the alloy material or other thermosetting thermoplastic material such as acrylics, resin material or unsaturated polyester.

As the preferred embodiment shown in FIG. 2a, the housing 210 includes a top plate 211 having a hole 212. The load bearing end 310 of the revolving axle 300 extends outwardly through the hole 212 of the housing 210 and connects to a seat 500 while the friction block 320 contacts the top plate 211. As FIG. 2a shows, the upper surface of the friction block 320 radially extends to form a second friction surface 330, which is disposed correspondingly to the first friction surface 230 formed in the interior surface of the top plate 211. As FIG. 2a shows, in the preferred embodiment, the first friction surface 230 is formed in the entire area of the interior surface of the top plate 211, wherein the first friction surface 230 fills up the entire area of the interior surface of the top plate 211. However, in another embodiment, the first friction surface 230 may be formed in the partial area of the interior surface of the top plate 211, wherein the area of the first friction surface 230 corresponds to the width of the upper surface of the friction block 320 and only fills up the interior surface of the top plate 211 partially. Furthermore, in this preferred embodiment, the second friction surface may separately contact the first friction surface.

As FIG. 2a shows, the first friction surface 230 is preferably formed by gluing the elastic material such as rubber, PP, PVC, or PE to the interior surface of the top plate 211. However, in another embodiment, certain soft material such as sponge, foam or other leather material may be glued to the interior surface of the top plate 211 to form the first friction surface 230 as well. As FIG. 2a shows, the second friction surface 330 formed in the upper surface of the friction block 320 preferably has an indentation cross section and contacts the first friction surface 230. However in another embodiment, the second friction surface 330 may be formed by an injection molding method to generate a granular surface in the upper surface of the friction block 320 or gluing the granular material to the upper surface of the friction block 320. Besides, in another embodiment, the first friction surface 230 may include forming an indentation cross section in the interior surface of the top plate 211, wherein the first friction surface 230 contacts the second friction surface 330 formed from gluing an elastic material or soft material to the upper surface of the friction block 320.

Figure 2B:
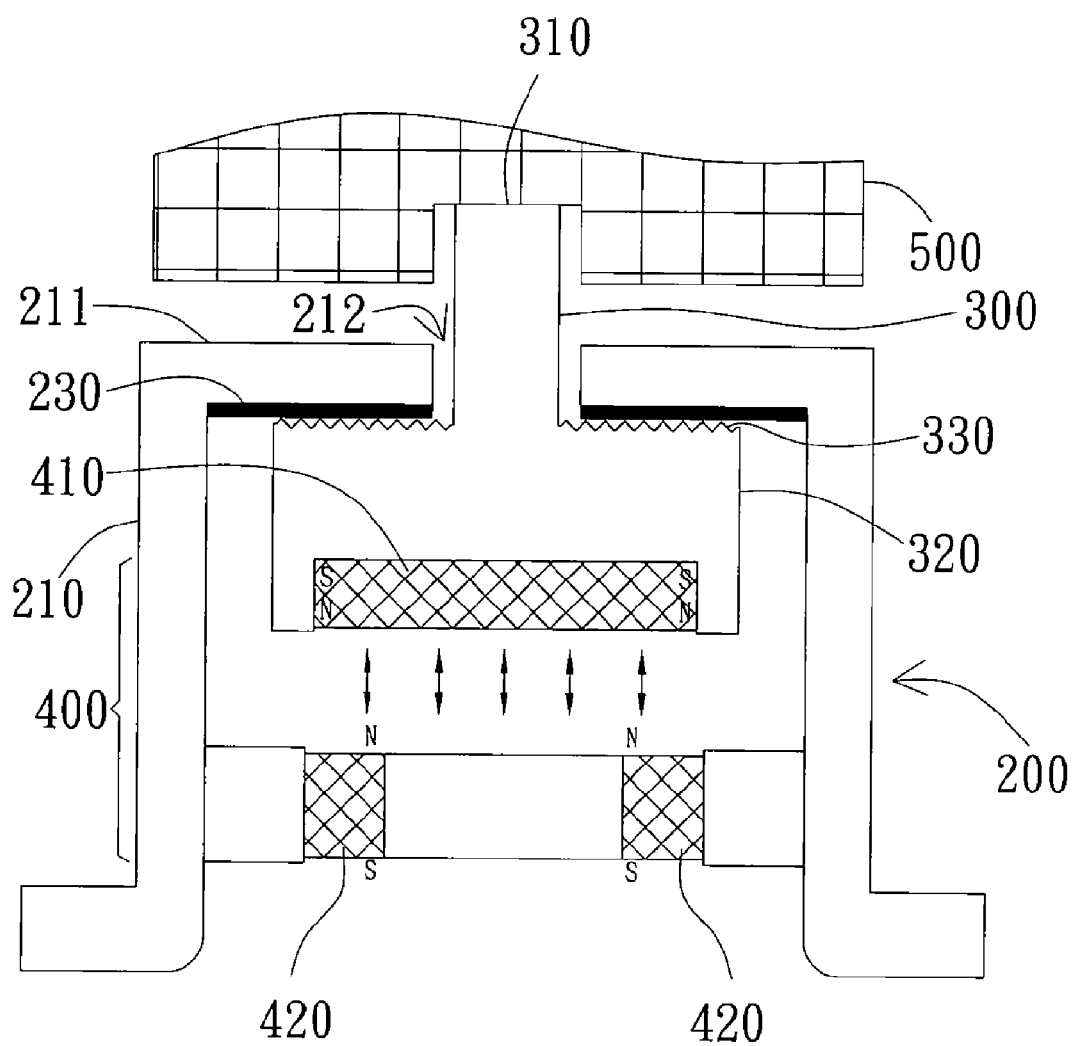
FIG. 2b is a sectional view of another embodiment of the present invention.

As the preferred embodiment shown in FIG. 2a and FIG. 2b illustrates, the friction block 320 is disposed in the housing 210 and is capable of moving along the axis up and down as well as revolving variably. The normal force providing device 400 is disposed between the friction block 320 and the bottom 220, wherein the normal force providing device 400 provides a normal force pushing the friction block 320 upwardly along the axis, thereby making the second friction surface 330 contact the first friction surface 230 to produce the friction. As shown in FIG. 2a, the normal force providing device 400 includes a first magnetic body 410 attached to the friction block 320 and a second magnetic body 420 disposed at the bottom 220. The first magnetic body 410 and the second magnetic body 420 are disposed with the same pole facing to each other so that a magnetic repulsion is generated to provide a normal force that presses against the friction block 320, thereby making the second friction surface 330 contact the first friction surface 230. As FIG. 2b shows, the second magnetic body 420 may be a circular magnet disposed inside the base 200 where it is lower than the first magnetic body 410 of the friction block 320. However in another embodiment, the second magnetic body 420 may be disposed at each of the both inner lateral wall of the base 200, whereby a magnetic repulsion is generated to press against the friction block 320 along the axis.

As the preferred embodiment shown in FIG. 2a and FIG. 2b, when the user presses the load bearing end 310 and exerts a force downwardly to the revolving axle 300, the bracing magnetic repulsion is countervailed and the friction is decreased so that the user may easily overcome the friction to rotate the revolving axle 300. In other words, when the user overcomes the friction to rotate the revolving axle 300, the revolving axle 300 may be axially rotated to any angle to match the user's demand. Once the revolving axle 300 rotates to the desired angle, the user may stop pressing against the load bearing end 310, then the magnetic repulsion between the second magnetic body 420 and the first magnetic body 410 represses against the friction block 320 right away to provide a stable support. In addition to decreasing the normal force for reducing the produced friction, if the user exerts a force larger than the magnetic repulsion, the first friction surface and the second friction surface would be separated so that the friction within would disappear.

Figure 3A:
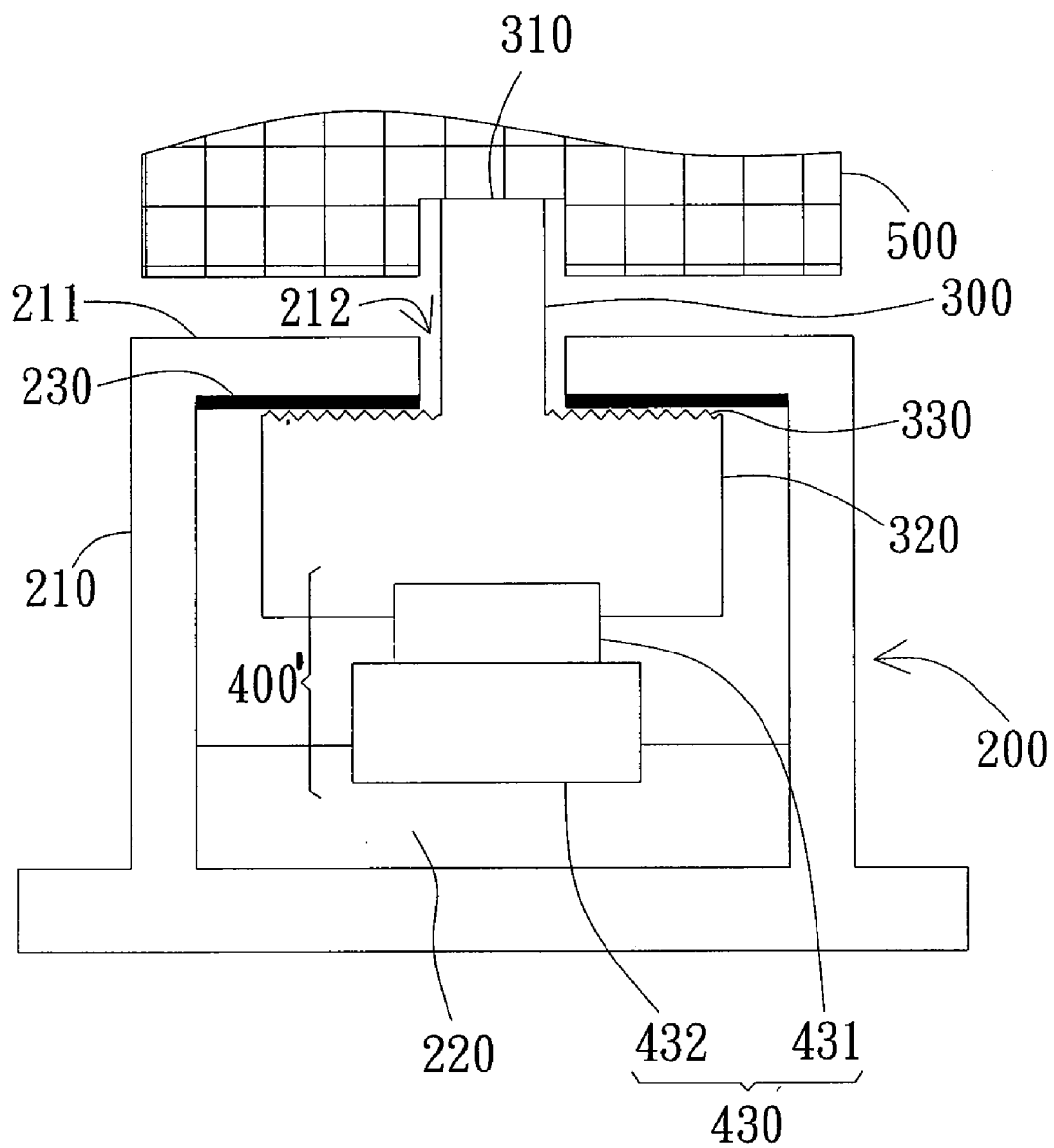
FIG. 3 is a sectional view of another embodiment of the present invention.

As the embodiment shown in FIG. 3a, the normal force providing device 400' preferably includes an air pressure device 430. A bottom end 432 of the air pressure device 430 is disposed on the bottom 220, and a stem 431 of the air pressure device 430 upwardly contacts the friction block 320, whereby the air pressure device 430 provides a normal force generated from an air pressure pushing against the friction block 320 so that the first friction surface 230 contacts the second friction surface 330. In this preferred embodiment, the air pressure device 430 further includes a pressure adjustment device provided for the user to adjust the air pressure variably. As a result, the user can adjust the amount of the force exerting on the revolving position device by adjusting the air pressure to control the proportion between the bear weight intensity and the weight of the display device.

Figure 3B:
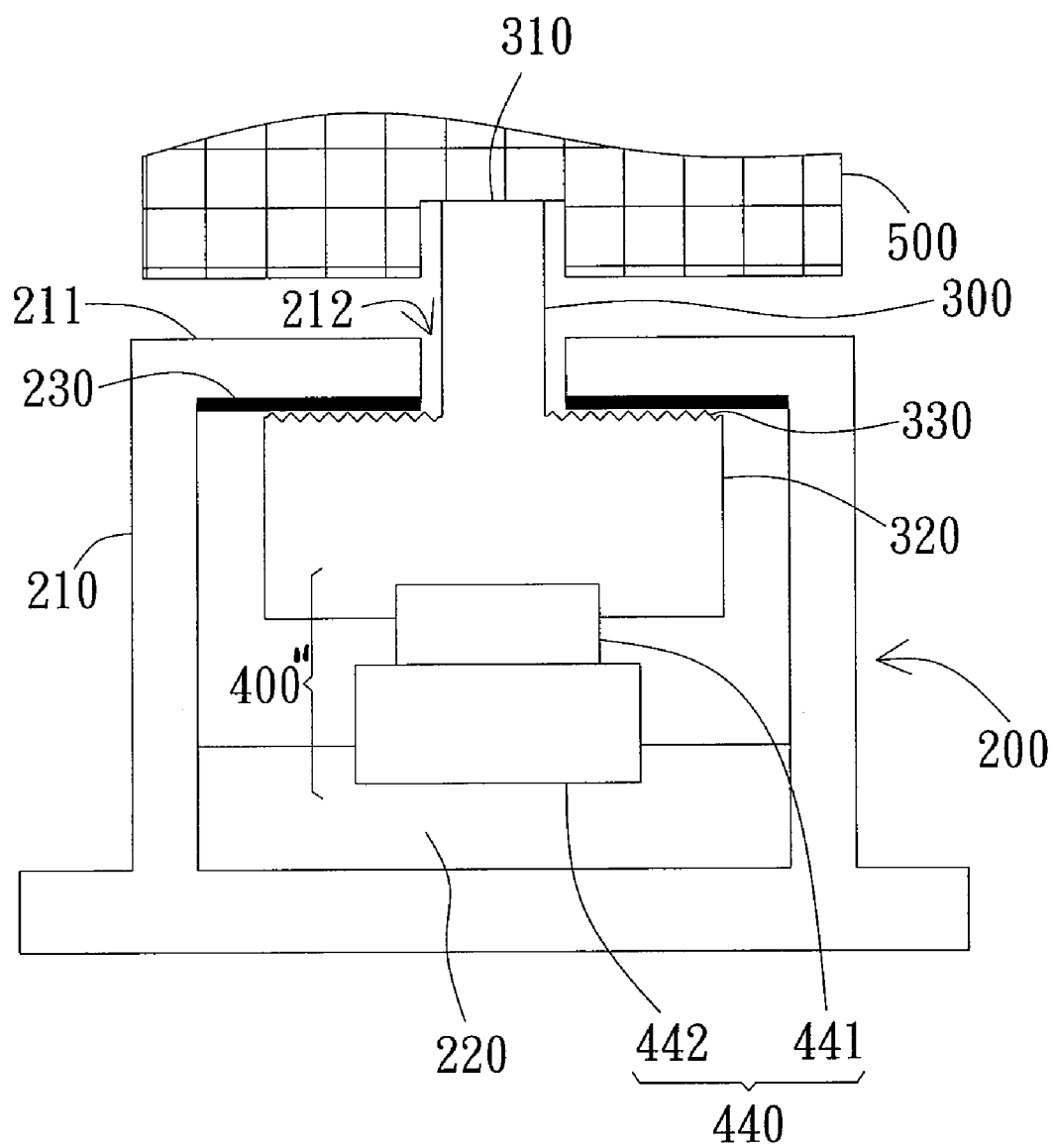

As FIG. 3b shows, the normal force providing device 400" preferably includes a hydraulic device 440. A bottom end 442 of the hydraulic device 440 is disposed on the bottom 220, a stem 441 of the hydraulic device 440 upwardly contacts the friction block 320, whereby the hydraulic device 440 provides a normal force generated from a hydraulic force pushing against the friction block 320 so that the first friction surface 230 contacts the second friction surface 330. In this preferred embodiment, the hydraulic device 440 further includes a pressure adjustment device provided for the user to adjust the hydraulic force variably. As a result, the user can adjust the amount of the force exerting on the revolving position device by adjusting the hydraulic force to control the proportion between the bear weight intensity and the weight of the display device.

Figure 4A:
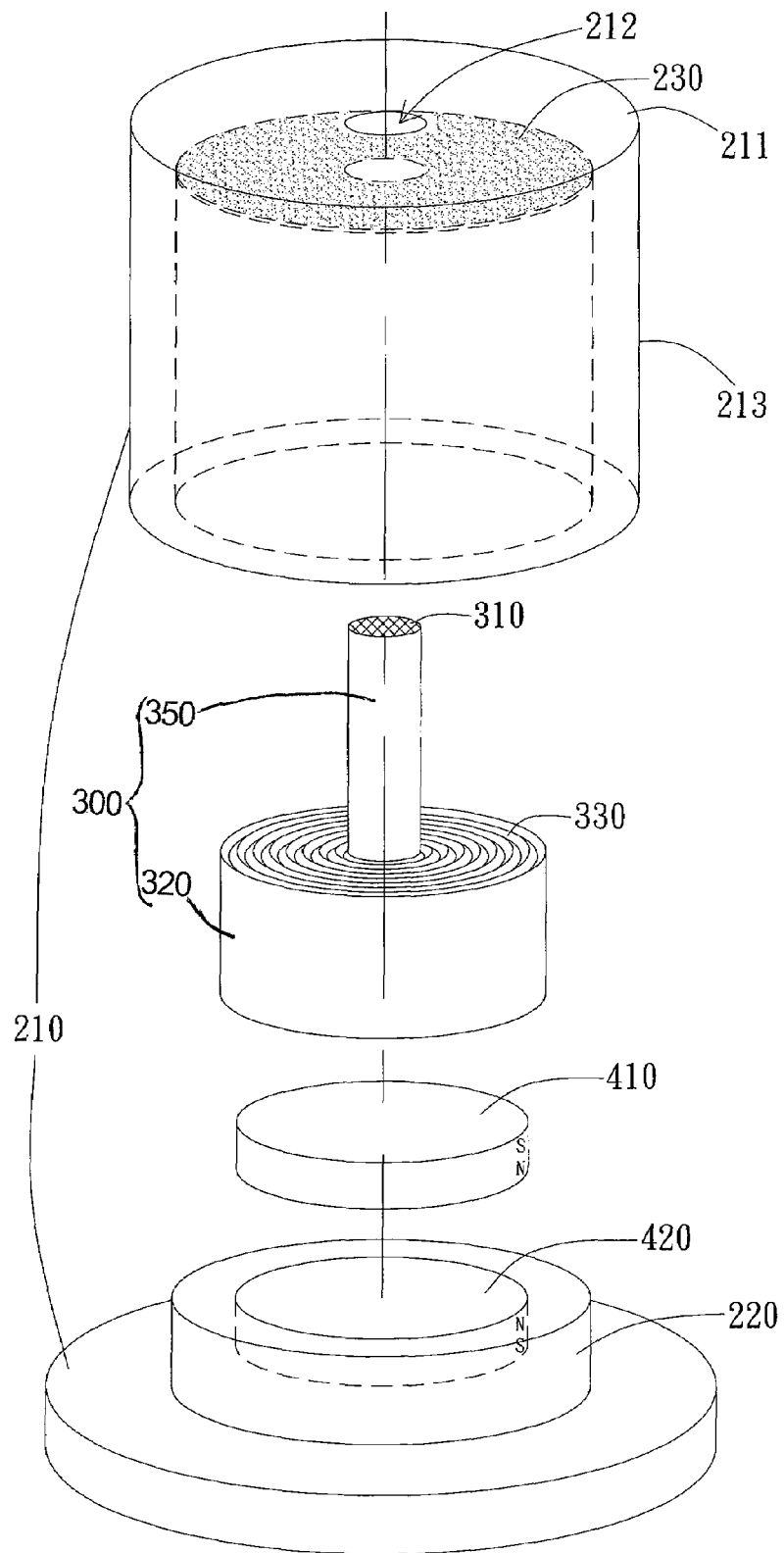
FIG. 4a is an explosive view of the embodiment of the present invention.

As FIG. 4a shows, the base 200 includes a circular body 211 and a lateral wall 213 connected to the bottom of the circular body 211, the revolving axle 300 includes a bracing axle 350 and a friction block 320, wherein the circular body 211 has a hole 212 and a bottom surface 230, the bracing axle 350 extends through the hole 212 outwardly and connects to the object that needs bracing outside the base 200. As FIG. 4a shows, in this preferred embodiment, the friction block 320 is disposed inside the base 200, having a top portion bigger than the hole 212 and capable of moving along the axis up and down as well as revolving variably. The friction block 320 also includes an upper surface 330 contacts the bottom surface 230 of the circular body. As the preferred embodiment shown in FIG. 4a and FIG. 4b, the normal force providing device 400 is disposed between the base and the friction block 320, wherein the normal force providing device 400 provides a bracing force upwardly to support the friction block 320. As a result, the upper surface 330 of the friction block 320 contacts the bottom surface 230 of the circular body and thereby generating a friction to brake the rotation of the revolving axle.

Figure 4B:
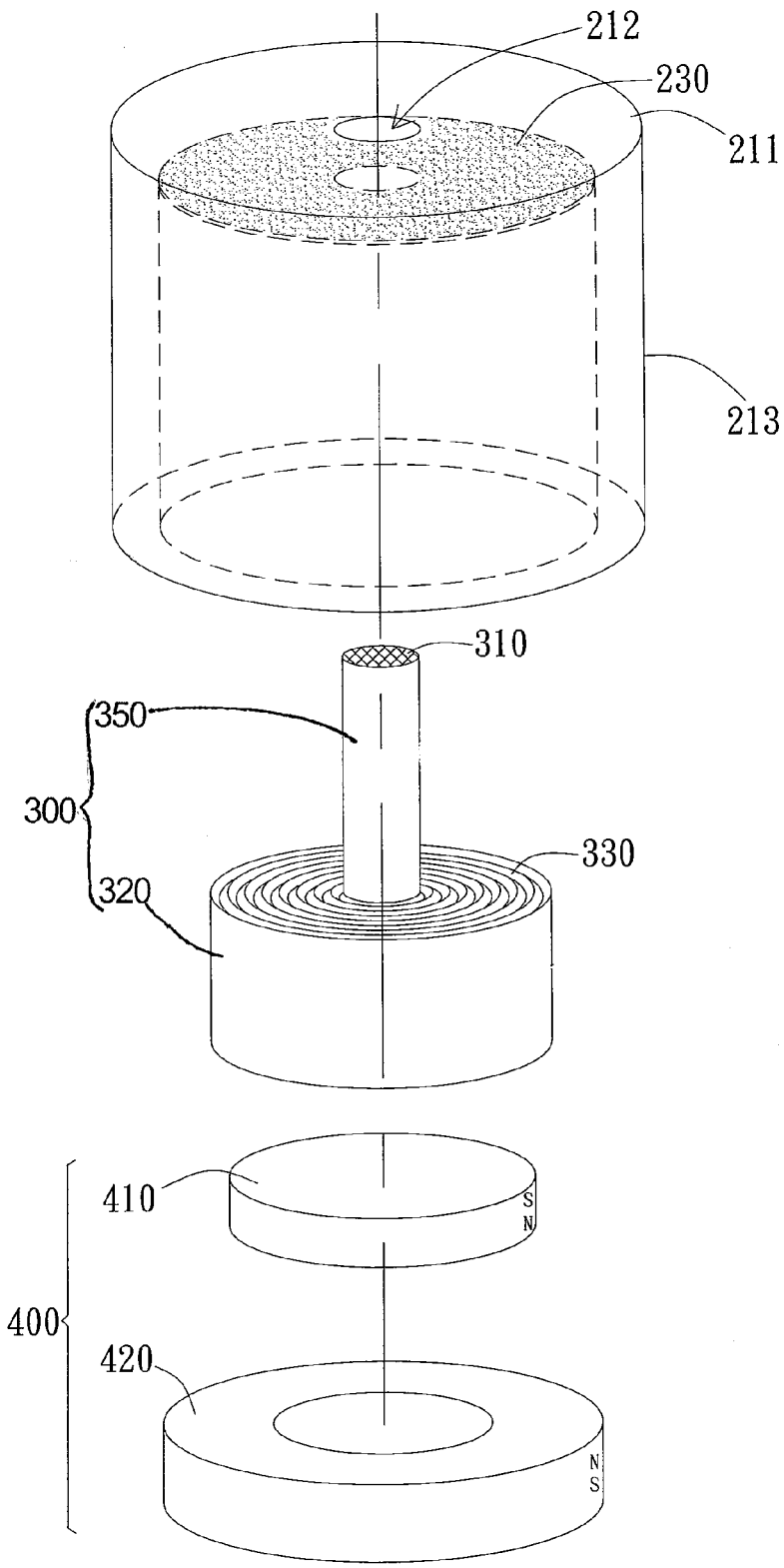
FIG. 4b is an explosive view of another embodiment of the present invention.

As FIG. 4a and FIG. 4b shows, in this preferred embodiment, the normal force providing device 400 includes a first magnetic body 410 attached to the friction block 320 and a second magnetic body 420 disposed at a position below the friction block 320 inside the base 200, wherein the first magnetic body 410 and the second magnetic body 420 are disposed with the same pole facing to each other, from within a magnetic repulsion is generated as the upward bracing force. As FIG. 4b shows, the second magnetic body 420 preferably includes a circular magnet embedded in the lateral wall 213 of the housing 210. However, in another embodiment, the second magnetic body 420 may be disposed in each of the both inner lateral wall of the base 200, whereby a magnetic repulsion is generated between the first magnetic body 410 and the second magnetic body 420 to presses against the friction block 320 along the axis.

As FIG. 4a shows, in this preferred embodiment, the material used for forming the bottom surface 230 of the circular body includes the elastic material such as rubber, PP, PVC, or PE. However in another embodiment, certain soft material such as sponge, foam or other leather material may be used for forming the bottom surface 230 of the circular body as well. As FIG. 4a shows, the upper surface 330 of the friction block 320 includes forming an indentation surface contacting the bottom surface 230 of the circular body, thereby producing a friction to brake the rotation of the revolving axle. However in another embodiment, the upper surface 330 may be formed by injection molding method to generate the granular surface in the upper surface of the friction block 320 or glue the granular material to the upper surface of the friction block 320. When a user presses the load bearing end 310 and exerts a force downwardly to the revolving axle 300, the bracing magnetic repulsion is countervailed and the friction is decreased so that the user may easily overcome the friction to rotate the revolving axle 300.

Figure 5:
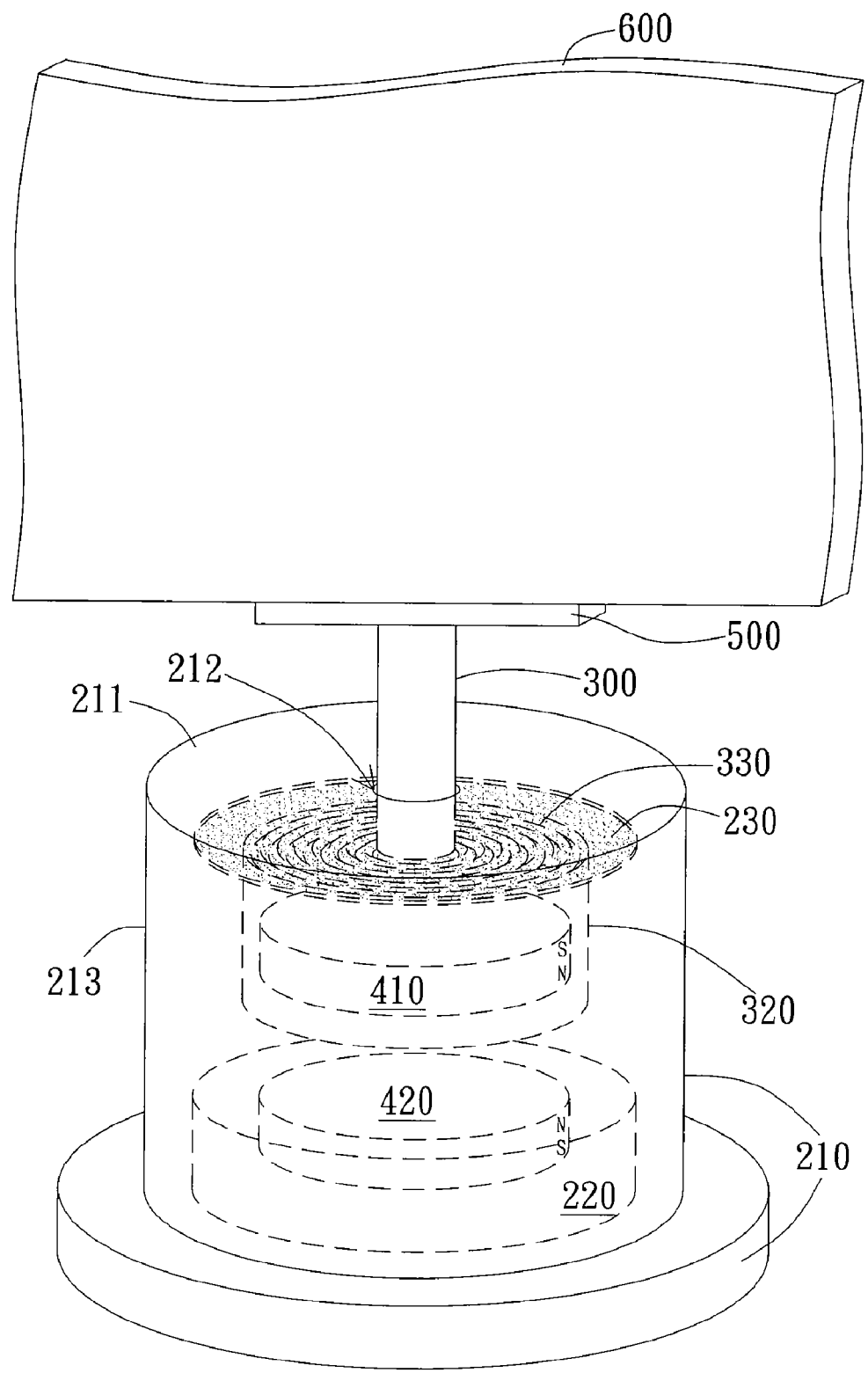
FIG. 5 is a three-dimensional view of the embodiment of the present invention.

FIG. 5 shows a preferred embodiment of a display device 600 coupled with a revolving position device. As FIG. 5 shows, the revolving position device includes a base 200, a revolving axle 300 and a normal force providing device 400, and the display device 600 includes a seat 500. Wherein the base 200 includes a housing 210 and a bottom 220, and the revolving axle 300 includes a load bearing end 310 and a friction block 320 opposite to the load bearing end 310. As FIG. 5 shows, in this preferred embodiment, the housing 210 includes a top plate 211 having a hole 212, the load bearing end 310 of the revolving axle 300 extends outwardly through the hole 212 to connect to the seat 500 and braces the display device 600. As FIG. 5 shows, the friction block 320 contacts the top plate 211, wherein the upper surface of the friction block 320 radially extends to form a second friction surface 330, which is disposed correspondingly to the first friction surface 230 formed in the interior surface of the top plate 211.

As the preferred embodiment shown in FIG. 5, the friction block 320 is disposed inside the housing 210 and capable of moving along the axis up and down as well as revolving variably. The normal force providing device 400 is disposed between the friction block 320 and the bottom 220, wherein the normal force providing device 400 provides a normal force pushing the friction block 320 upwardly along the axis, thereby making the second friction surface 330 contact the first friction surface 230 to generate the friction. As FIG. 5 shows, the normal force providing device 400 includes a first magnetic body 410 attached to the friction block 320 and a second magnetic body 420 disposed at the bottom 220, wherein the first magnetic body 410 and the second magnetic body 420 are disposed with the same pole facing to each other. As a result, a magnetic repulsion is generated to provide a normal force presses against the friction block 320, thereby making the second friction surface 330 contact the first friction surface 230. In this preferred embodiment, the second magnetic body 420 may include a circular magnet disposed inside the base 200 where it is lower than the first magnetic body 410 of the friction block 320. However in another embodiment, the second magnetic body 420 may be disposed at each of the both inner lateral wall of the base 200, whereby a magnetic repulsion is generated to press against the friction block 320 along the axis.

As the preferred embodiment shown in FIG. 5 illustrates, when a user exerts a force downwardly to the display device 600, the bracing magnetic repulsion is countervailed and the friction is decreased so that the user may easily overcome the friction to rotate the revolving axle 300. In other words, when the user overcomes the friction to rotate the revolving axle 300, the revolving axle 300 may be axially rotated to any angle in order to match the user's demand. Once the revolving axle 300 rotates to the desired angle, the user may stop pressing against the display device 600, then the magnetic repulsion between the second magnetic body 420 and the first magnetic body 410 represses against the friction block 320 right away to provide a stable support.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A revolving position device, comprising:
   a base including a housing and a bottom, wherein the housing has at least a first friction surface;
   a revolving axle including a load bearing end and a friction block opposite to the load bearing end, the friction block having an upper surface formed as a second friction surface against the first friction surface, wherein the friction block is disposed in the housing and capable of rotating and moving along the axis up and down; and
   a normal force providing device disposed between the friction block and the bottom, wherein the normal force providing device provides a normal force pushing the friction block upwardly along the axis, thereby making the second friction surface contact the first friction surface.

2. The revolving position device of claim 1, wherein the normal force providing device includes a first magnetic body attached to the friction block and a second magnetic body disposed at the bottom, wherein the first magnetic body and the second magnetic body are disposed with the same pole facing to each other.

3. The revolving position device of claim 1, wherein the housing includes a top plate, the top plate has a hole and an interior surface forming the first friction surface, the load bearing end extends outwardly through the hole of the housing.

4. The revolving position device of claim 1, wherein the upper surface of the friction block radically extends to form a second friction surface.

5. The revolving position device of claim 1, wherein the second friction surface separably contacts the first friction surface.

6. The revolving position device of claim 1, wherein the normal force providing device includes an air pressure device having two ends, one end connects to the bottom and the other end connects to the friction block, whereby the air pressure device provides an air pressure pushing against the friction block and makes the first friction surface contact the second friction surface.

7. The revolving position device of claim 6, wherein the air pressure device further includes a pressure adjustment device for adjusting the air pressure variably.

8. The revolving position device of claim 1, wherein the normal force providing device includes a hydraulic device having two ends, one end connects to the bottom and the other end connects to the friction block, whereby the hydraulic device provides a hydraulic force pushing against the friction block and makes the first friction surface contact the second friction surface.

9. The revolving position device of claim 8, wherein the hydraulic device further includes a pressure adjustment device for adjusting the hydraulic force.

10. The revolving position device of claim 1, wherein the at least a first friction surface includes an elastic material contact the second friction surface for generating a friction to brake the rotation of the revolving axle.

11. The revolving position device of claim 1, wherein the second friction surface includes an indentation surface contact the second friction surface for generating a friction to brake the rotation of the revolving axle.

12. A display device, comprising:
    a display device, the display device having a seat; and
    a revolving position device, comprising:
      a base including a housing and a bottom, wherein the housing has at least a first friction surface;
      a revolving axle including a load bearing end and a friction block opposite to the load bearing end, the load bearing end connected to the seat, the friction block having an upper surface formed as a second friction surface against the first friction surface, wherein the friction block is disposed in the housing and capable of rotating and moving along the axis up and down; and
      a normal force providing device disposed between the friction block and the bottom, wherein the normal force providing device provides a normal force pushing the friction block upwardly along the axis so that the second friction surface contacts the first friction surface and braces the display device.

13. The display device of claim 12, wherein the normal force providing device includes a first magnetic body attached to the friction block and a second magnetic body disposed at the bottom, wherein the first magnetic body and the second magnetic body are disposed with the same pole facing to each other.

14. The display device of claim 12, wherein the housing includes a top plate, the top plate has a hole and an interior surface forming the first friction surface, the load bearing end extends outwardly through the hole of the housing.

15. The display device of claim 12, wherein the upper surface of the friction block radically extends to form a second friction surface.

16. The display device of claim 12, wherein the display device coupled with the revolving axle revolves along the axis.

17. The display device of claim 12, wherein the normal force providing device includes an air pressure device having two ends, one end connects to the bottom and the other end connects to the friction block, whereby the air pressure device provides an air pressure pushing against the friction block and makes the first friction surface contact the second friction surface and brace the display device.

18. The display device of claim 17, wherein the air pressure device further includes a pressure adjustment device for adjusting the air pressure variably.

19. The display device of claim 12, wherein the normal force providing device includes a hydraulic device having two ends, one end connects to the bottom and the other end connects to the friction block, whereby the hydraulic device provides a hydraulic force pushing against the friction block and makes the first friction surface contact the second friction surface and brace the display device.

20. The display device of claim 19, wherein the hydraulic device further includes a pressure adjustment device for adjusting the hydraulic force.

21. A positioning device, comprising:
    a base including a circular body and a lateral wall connected to the circular body, the circular body having a hole and a bottom surface;
    a revolving axle including a brace axle and a friction block, the brace axle extending through the hole outwardly and connecting to a matter that needs bracing, the friction block being set in the base and having an upper surface, wherein the friction block is bigger than the hole and capable of rotating and moving along the axis up and down; and
    a normal force providing device disposed between the base and the friction block, wherein the normal force providing device upwardly provides a bracing force to support the friction block, making the upper surface of the friction block contact the bottom surface of the circular body thereby generating a friction to restrict the rotation of the revolving axle;

when a user presses the revolving axle downwardly, the bracing force is countervailed and the friction between the upper surface and the bottom surface is decreased so that the user may easily overcome the friction to rotate the revolving axle and the matter that needs bracing.

22. The positioning device of claim 21, wherein the normal force providing device includes a first magnetic body and a second magnetic body, the first magnetic body is attached to the friction block and the second magnetic body disposed at a position below the friction block inside the base, whereby the first magnetic body and the second magnetic body are disposed with the same pole facing to each other, from within a magnetic repulsion is generated as a bracing force to support upwardly.

23. The positioning device of claim 21, wherein the bottom surface of the circular body includes an elastic material contacting the upper surface of the friction block, which helps generating a friction to brake the revolving axle.

24. The positioning device of claim 21, wherein the upper surface of the friction block includes forming an indentation surface contacting the bottom surface of the circular body, which helps generating a friction to brake the revolving axle.

* * * * *